United States Patent [19]

Bruckert

[11] 4,174,363
[45] Nov. 13, 1979

[54] VAPOR-LIQUID CONTACTING TRAY WITH VAPOR THRUST MEANS

[75] Inventor: Walter Bruckert, Antwerp, Belgium

[73] Assignee: Union Carbide Corporation, New York, N.Y.

[21] Appl. No.: 885,296

[22] Filed: Mar. 10, 1978

[51] Int. Cl.² .............................................. B01D 3/22
[52] U.S. Cl. .......................... 261/114 TC; 261/114 R
[58] Field of Search ....... 261/114 R, 114 TC, 114 JP, 261/113; 202/158

[56] References Cited

U.S. PATENT DOCUMENTS

| | | | |
|---|---|---|---|
| 2,210,808 | 8/1940 | Glitsch | 261/114 R |
| 2,582,657 | 1/1952 | Serner | 261/114 TC |
| 2,611,457 | 9/1952 | Glitsch | 261/114 TC |
| 2,681,820 | 6/1954 | Rapisarda et al. | 261/114 R |
| 2,787,453 | 4/1957 | Hibshman et al. | 261/114 R |
| 3,053,520 | 9/1962 | Streuber | 261/114 R |
| 3,282,576 | 11/1966 | Bruckert et al. | 261/114 JP |
| 3,417,975 | 12/1968 | Williams et al. | 261/113 |
| 3,759,497 | 9/1973 | Black | 261/113 |

*Primary Examiner*—Frank W. Lutter
*Assistant Examiner*—Gregory N. Clements
*Attorney, Agent, or Firm*—Steven J. Hultquist

[57] ABSTRACT

A vapor-liquid contacting tray is disclosed having an enclosure member overlying and extending transversely across the tray deck top surface from a portion above a tray support ring to an adjacent perforated portion of the tray deck wherein the perforation openings are unobstructed by the support ring. A vapor flow opening is located in the enclosure member over the portion of the tray deck above the support ring. Vapor flowing into the enclosure member from the overlaid tray deck perforation openings is directed through the vapor flow opening into the liquid on the tray deck surface portion overlying the support ring, to effect vapor-liquid contacting and prevent liquid flow stagnation thereon.

10 Claims, 15 Drawing Figures

FIG. 6
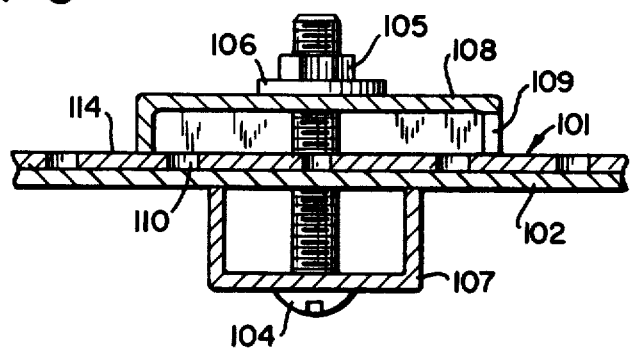
FIG. 7
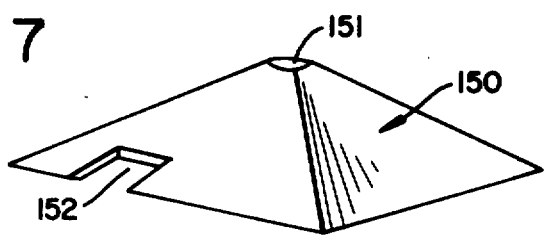
FIG. 9
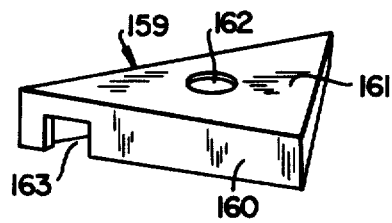
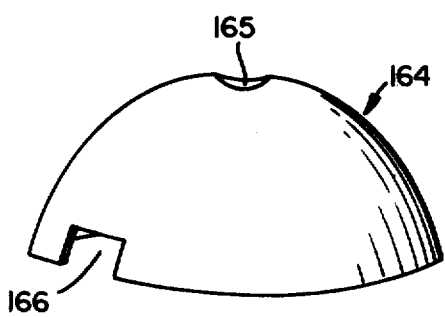
FIG. 10
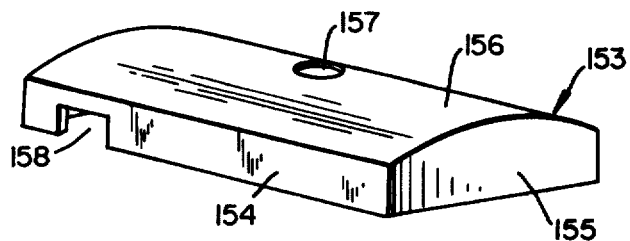
FIG. 8

VAPOR-LIQUID CONTACTING TRAY WITH VAPOR THRUST MEANS

BACKGROUND OF THE INVENTION

1. Field of the Invention

This invention relates to means for eliminating liquid flow stagnation on vapor-liquid contacting trays in the region of a support ring on which the tray is mounted.

2. Description of the Prior Art

In the general practice of vapor-liquid contacting, as for example in distillation and absorption applications, contacting columns are commonly employed which comprise a casing in which a plurality of horizontally aligned vapor-liquid contacting trays are disposed. These contacting trays are vertically spaced apart from one another and are mounted in the casing on imperforate support rings joined to an inner surface of the casing. The imperforate support rings extend inwardly from the casing such that the support rings underlie the peripheral portions of the contacting trays for support thereof. Typically, clamp means are employed to rigidly secure the contacting trays to the support rings.

The vapor-liquid contacting trays employed in the conventional contacting column are commonly of the well-known cross-flow type. Such contacting trays include a horizontally aligned deck having main flat top and bottom surfaces, with vapor flow perforation openings extending through the deck. Liquid inlet means are provided at one edge of the tray deck and liquid discharge means at an opposite edge thereof whereby a liquid flow path is formed extending across the tray deck from the inlet to the liquid dischage. Such trays may be of the single pass or multiple pass types with cross-flow or parallel flow of liquid on the tray deck.

In the use of the above-described vapor-liquid contacting systems, a serious hydraulic flow stagnation problem has been found to be associated with the peripheral portions of the vapor-liquid contacting tray. One reason for such flow stagnation problem is that the periphery or outer edge of the vapor-liquid contacting tray is bounded by an inner wall surface of the contacting column casing. Liquid flowing across the main flat top surface of the tray deck from the liquid inlet to the liquid discharge in the peripheral portions of the flow path adjacent the inner wall surface of the contacting column casing experiences a frictional drag force from the casing wall surface. Although a frictional drag force is imposed by the tray deck main flat top surface on the liquid flowing across the gas-liquid contacting surface, the overall frictional drag force exerted on the liquid in the region of the casing wall surface is substantially greater. Experience with cross-flow vapor-liquid contacting trays has demonstrated that the existence of frictional wall surface drag causes the liquid flow to be retarded near the contacting column wall while the liquid in the central portions of the tray move with a reasonably uniform velocity across the tray deck from the liquid inlet to the liquid discharge. The deficiency due to frictional wall drag is compounded by the lateral distribution of liquid residence times on the tray surface, arising from the fact that the liquid flow path adjacent the casing wall regions of the tray is longer than in the central region of the tray. Such phenomena result in the occurrence of liquid flow stagnation along the peripheral portions of the liquid flow path adjacent the inner surface of the contacting column casing.

The aforementioned liquid flow stagnation along the peripheral liquid flow path portions adjacent the inner surface of the contacting column casing is associated with severely reduced contacting efficiency for the overall tray. In the stagnant wall region of the vapor-liquid contacting surface, the liquid does not replenish itself at a sufficient rate as in the central portions of the tray surface. As a result, the liquid in the wall surface regions will rapidly reach equilibrium with the gas or vapor stream passing upwardly through the vapor flow perforation openings in the tray deck and little subsequent mass transfer will take place on that part of the tray. The peripheral liquid flow path portions of the tray adjacent the inner surface of the contacting column casing thus constitute tray areas in which relatively little mass transfer takes place, thereby contributing to a significant reduction in the overall tray contacting efficiency.

Another operating deficiency associated with the peripheral portions of the tray adjacent the inner surface of the contacting column casing is the low extent of vapor-liquid contacting on such portions of the tray due to the presence of the aforementioned support rings. As described, imperforate support rings are conventionally joined to an inner surface of the casing and extend horizontally inwardly therefrom such that the support rings underlie the peripheral portions of the contacting tray for support thereof in the contacting column. In commercial size contacting columns, the imperforate support rings normally extend inwardly a distance of two to four inches from the inner surface of the contacting column casing. Typical crossflow vapor-liquid contacting trays employ a multiplicity of vapor flow perforation openings distributed across and extending through the tray deck for flow of the generally upwardly flowing gas into the liquid supported on the main flat top surface of the contacting tray. When such contacting trays are installed in a contacting column, the circumferentially extending imperforate support rings effectively block any vapor flow openings in the peripheral portions of the tray which overlie the support ring in the portions of the tray adjacent to the inner surface of the column casing. The tray area adjacent the inner surface of the column casing therefore becomes inactive in operation, since vapor is prevented from contacting liquid on this portion of the tray surface. The consequences of the resultant less than full utilization of the column cross-section for vapor flow include an increase in vapor velocities through the vapor flow perforation openings on the remainder of the tray deck, a decrease in local mass-transfer efficiency in the central portions of the tray due to higher superficial velocity of the vapor through the perforation openings in the tray deck and a resultant tendency toward entrainment, and reduced flooding limits for the tray.

Accordingly, it is an object of the present invention to provide means for eliminating liquid flow stagnation on vapor-liquid contacting trays in the region of the inner surface of the casing in which the tray is mounted.

In addition, it is an object of the present invention to provide means for insuring vapor-liquid contact in the peripheral liquid flow path portions of the tray deck adjacent the inner surface of the contacting column casing, where vapor-liquid contact is normally prevented by the circumferentially extending imperforate support ring.

Other objects and advantages of the present invention will be apparent from the ensuing disclosure and appended claims.

SUMMARY OF THE INVENTION

This invention relates to a means for eliminating liquid flow stagnation and for providing vapor-liquid contacting on a contacting tray in the region of a support ring on which the tray is mounted.

Broadly, the present invention relates to a vapor-liquid contacting column including a casing in which a plurality of generally horizontally aligned vapor-liquid contacting trays are disposed, vertically spaced apart from one another and mounted in the casing on substantially imperforate support rings such that the support rings underlie portions of the contacting trays for support thereof. Clamp means are provided for rigidly securing the contacting trays to the support rings. The contacting trays each include a horizontally aligned deck having main flat top and bottom surfaces, with vapor flow perforation openings extending through the deck and liquid transfer means associated with the tray for transferring liquid previously contacted on the tray deck to a next underlying tray in the contacting column.

Under the foregoing, the improvement of this invention comprises an enclosure member overlying and extending transversely across the deck main flat top surface from a portion thereof above the support ring to an adjacent perforated portion of the tray deck wherein the vapor flow perforation openings are unobstructed by the support ring such that the enclosure member forms an enclosed spatial volume with respect to and above the overlaid tray deck portion. A vapor flow slot opening is provided in the enclosure member located over the portion of the tray deck above the support ring, such that closed gas flow communication is provided from the vapor flow perforation openings in the adjacent perforated portion of the tray deck overlaid by the enclosure member to the vapor flow opening in the enclosure member, whereby vapor flowing through the perforation openings and entering the enclosed spatial volume of the enclosure member is directed through the vapor flow opening into the liquid on the tray deck main flat top surface portion overlying the support ring, to effect vapor-liquid contact and prevent liquid flow stagnation thereon.

As used herein, "a downstream portion of the enclosure member" means that portion of the enclosure member which lies in the downstream direction with respect to a liquid flow path extending from a liquid inlet to a liquid discharge of the tray, or, in other words, that portion of the enclosure member which faces in the direction of and is most proximate to the liquid discharge. As also used herein, "closed gas flow communication from the vapor flow perforation openings overlaid by the enclosure member to the vapor flow opening in the enclosure member" means that the enclosure member substantially gas-tightly abuts the main flat top surface of the tray deck.

BRIEF DESCRIPTION OF THE DRAWINGS

FIG. 6 is a sectional elevation view of the vapor-liquid contacting system of FIG. 4, taken along line B—B.

FIG. 7 is an isometric view of an enclosure member according to one embodiment of the present invention.

FIG. 8 is an isometric view of an enclosure member according to another embodiment of the present invention.

FIG. 9 is an isometric view of an enclosure member according to still another embodiment of the present invention.

FIG. 10 is an isometric view of an enclosure member according to yet another embodiment of the present invention.

DESCRIPTION OF THE PREFERRED EMBODIMENTS

Figure 1:
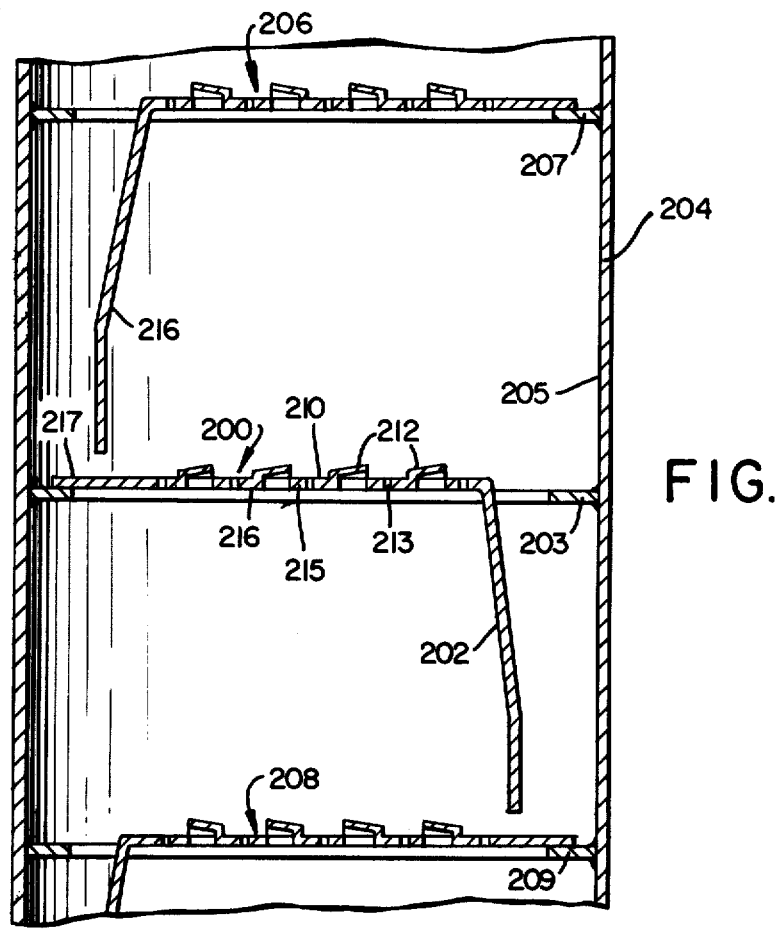
FIG. 1 is a sectional view in elevation of a portion of a vapor-liquid contacting column in which the present invention may usefully be employed.

Referring now to the drawings, FIG. 1 shows a sectional elevational view of a vapor-liquid contacting column in which the means of the present invention may advantageously be employed. The vapor-liquid contacting column as illustrated includes a casing 204 in which a plurality of generally horizontally aligned vapor-liquid contacting trays 206, 200 and 208 are disposed, vertically spaced apart from one another and mounted in the casing on imperforate support rings 207, 203 and 209, respectively. The imperforate support rings are joined to an inner surface 205 of the casing and extend horizontally inwardly from the casing such that the support rings underlie the peripheral portions of the contacting trays for support thereof. The contacting trays are all of a conventional cross-flow type. Tray 200 is illustrative and includes a horizontally aligned deck 215 having a main flat top surface 210 and a main flat bottom surface 216. Vapor flow perforation openings 213 extend through the deck, which also features slot opening members 212 which may suitably be of a type as disclosed and claimed in U.S. Pat. No. 3,417,975 to Williams, et al. Liquid inlet means comprising the lower portion of downcomer side wall 216 and the imperforate peripheral portion 217 of the tray deck are provided at one edge of the tray deck and liquid discharge means comprising the downcomer formed by the downcomer side wall 202 and the associated portion of the column casing inner wall surface is provided at an opposite edge of the tray deck, whereby a liquid flow path is formed extending across the tray deck main flat top surface from the liquid inlet to the liquid discharge including peripheral flow path portions adjacent the inner surface of the casing 204. In operation, liquid flows from the liquid inlet across the tray deck to the liquid discharge and is transferred to the next lower tray by the discharge downcomer means. Concurrently, upwardly flowing vapor passes through the perforation openings 213 and slot openings defined by the slot means 212, to effect vapor-liquid contact with the liquid flowing across the main flat top surface of the tray.

Figure 2:
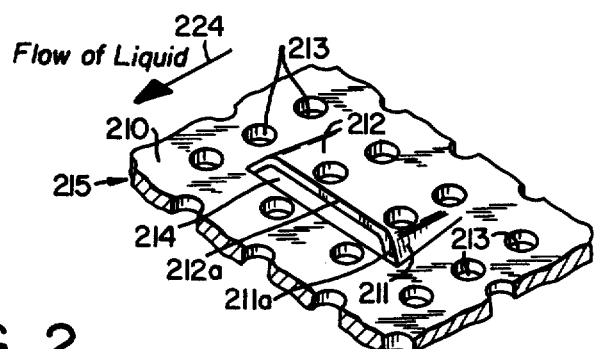
FIG. 2 is an isometric view of a portion of the tray deck of a vapor-liquid contacting employed in the FIG. 1 contacting system.

FIG. 2 is an isometric view of a portion of the vapor-liquid contacting tray as employed in the FIG. 1 contacting system. Situated on the main flat top surface 210 of the tray deck are a number of fixed size vapor flow perforation openings 213 normal to the surface 210 and extending through the tray deck 215. Also on the main flat surface 210 are a number of elevated portions formed from the tray deck having a top surface 212 inclined to the main flat top surface 210 and integral therewith. These elevated portions also have sides 211 which are also inclined to the main flat top surface 210 and integral therewith. The top surface 212 and the inclined sides 211 have leading edges 212a and 211a respectively above the main flat top surface 210. The flat surface just below leading edge 212a and the leading edges 211a of the inclined sides 211 are situated such that they form an aperture or slot 214 having an aperture plane which may be normal to the main flat top surface 210 or slightly inclined thereto, depending upon the manner in which the elevated portions are initially formed.

In operation, a process vapor or gas flows only through perforation openings 213 and slot 214. A portion of the vapor passing through the perforation openings 213 normal to the tray main flat top surface 210 proceeds through a process liquid contained on the tray deck main flat top surface and forms bubbles while passing through the process liquid. In this manner, intimate contact with the liquid and vapor is achieved. The vapor passing through slot 214 does not leave the surface of the tray normal thereto as does vapor passing through the perforation openings 213. Instead, the vapor impinges on the lower side of slot top surface 212 and is directed obliquely into the process liquid. In this manner, the under-side surface acts as a gas flow directing surface. It should also be noted that the slot opening 214 functions as a throat, i.e., it converts pressure drop to kinetic energy. The kinetic energy or vapor thrust associated with this portion of the vapor is at an angle to the tray surface 210. This inclined force vector may then be resolved into its horizontal and vertical components. The horizontal component is directed into and adsorbed by the process liquid thereby causing the process liquid to flow in the direction 224.

The tray deck portion shown in FIG. 2 and employed in the contacting trays of FIG. 1 are constructed in accordance with the treachings of the aforementioned Williams et al patent, U.S. Pat. No. 3,417,975. This patent describes a gas-liquid contact tray employing a uniform pattern of fixed size openings with walls normal to the tray surface and a uniform pattern of obliquely inclined openings, the latter being oriented in the downstream direction of liquid flow. Trays designed in accordance with the Williams et al patent perform with improved efficiency owing to the elimination of longitudinal hydraulic gradient in the liquid on the tray main flat top surface. The additional degree of design freedom afforded by the two sets of fixed apertures results in utilization of only a predetermined, appropriate fraction of the total available vapor thrust to accomplish liquid transport across the tray. Other factors being equal, the neutralization of the hydraulic gradient produces uniform resistance to vapor penetration on the tray main flat top surface, and both the vapor and liquid flows are uniformly distributed over the active area of the tray.

Figure 3:
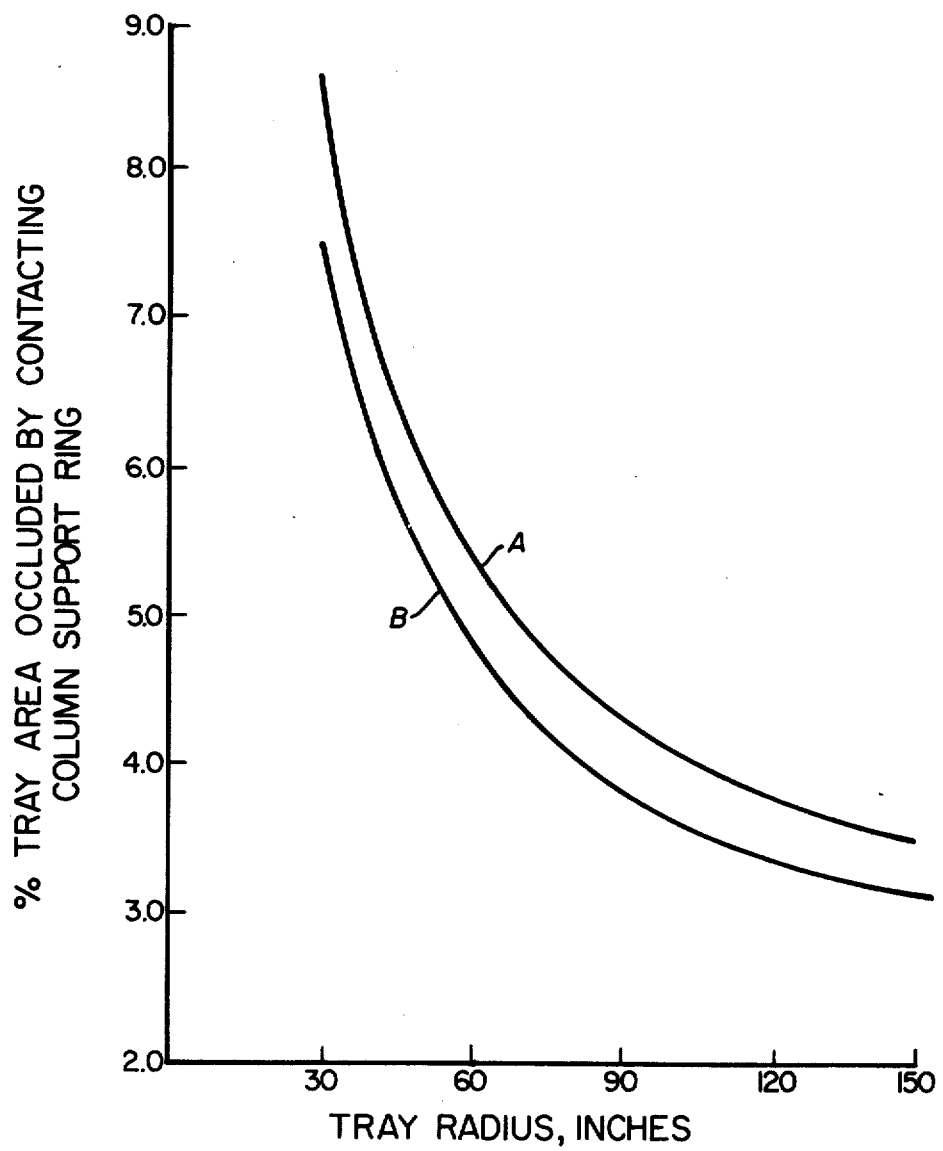
FIG. 3 is a graph of the percentage tray area occluded by a contacting column support ring plotted as a function of tray radius in inches, for a vapor-liquid contacting column employing single pass, crossflow trays.

FIG. 3 is a graph of the percentage tray area occluded by the contacting column support ring, for a conventional cross-flow contacting tray of the type as shown in FIG. 1, plotted as a function of tray radius, in inches. Two illustrative curves are shown on the graph. Curve A represents a cross-flow tray in which 10% of the tray surface area is constituted by liquid transfer means, either downcomer discharge means or imperforate tray deck liquid inlet means. Curve B is for a cross-flow contacting tray wherein 25% of the tray surface area is devoted to liquid transfer (inlet or discharge) means. FIG. 3 is based on the data set forth in the table below, wherein the support ring width (the distance that the support ring extends inwardly from the inner surface of the contacting column casing) which is required based on structural support considerations for a given tray diameter is tabulated.

TABLE

Support Ring Width for Various Cross-Flow Contacting Tray Diameters

| Tray Diameter (ft.) | Support Ring Width (in.) |
|---|---|
| 25 | 4 |
| 20 | 3½ |
| 15 | 3 |
| 10 | 2½ |
| 5 | 2 |

As shown by the graph of FIG. 3, the contacting tray support ring occludes a significant fraction of the tray surface area, which otherwise could be usefully employed for vapor-liquid contacting. For example, for a contacting tray designed for 75% active tray area (curve B) a 25 foot diameter contacting column employing 4 inch wide support rings would result in approximately 11 square feet of tray surface area being blocked by the support ring on each tray in the contacting column. As discussed earlier herein, this blocked area of the vapor-liquid contacting tray portion overlying the support ring has heretofore been unavailable for vapor-liquid contacting. Such deficiency is overcome by means of the present invention, as will now be described in greater detail.

Figure 4:
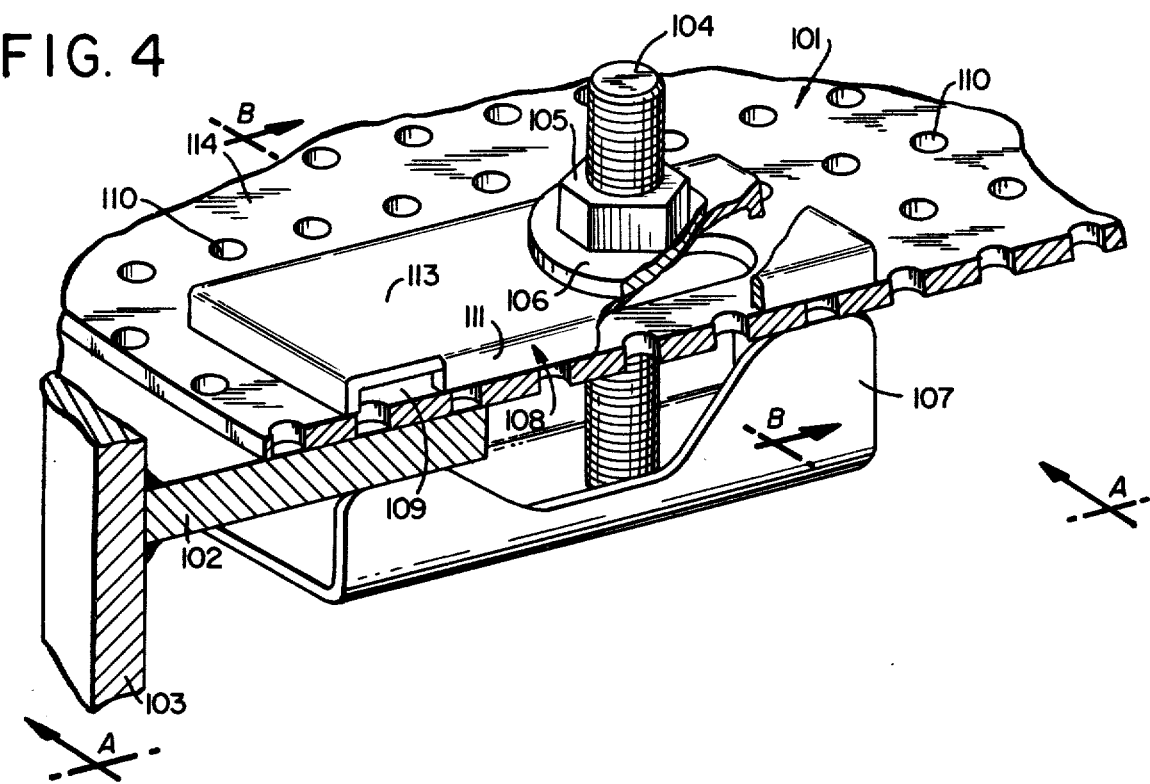
FIG. 4 is an isometric view of a portion of a vapor-liquid contacting column in which a contacting tray employing the present invention is mounted.

FIG. 4 is an isometric view of a peripheral portion of a vapor-liquid contacting tray employing the present invention, shown as mounted on the imperforate support ring attached to an inner surface of the contacting column casing. The vapor-liquid contacting column includes a casing 103 in which vapor-liquid contacting tray 101 is disposed, mounted in the casing on imperforate support ring 102 joined to an inner surface of the casing and extending horizontally inwardly therefrom such that the support ring underlies the peripheral portion of the contacting tray for support thereof. Clamp means including clamp member 107 rigidly secure the contacting tray 101 to the support ring 102.

The contacting tray 101 includes a horizontally aligned deck 114 having main flat top and bottom surfaces, with vapor flow perforation openings 110 extending through the deck. Although only a peripheral portion of the contacting tray is illustrated, the tray has liquid inlet means at one edge of the tray deck and liquid discharge means at an opposite edge whereby a liquid flow path is formed extending across the tray deck main flat top surface from the liquid inlet to the liquid discharge including the peripheral flow path portion as shown, adjacent the inner surface of the contacting column casing.

In accordance with the improvement of the present invention, the contacting tray comprises an enclosure member 108 overlying and extending transversely across the deck main flat top surface from a peripheral portion thereof above the support ring 102 to an adjacent perforated portion of the tray deck wherein the vapor flow perforation openings 110 are unobstructed by the support ring such that the enclosure member forms an enclosed spatial volume with respect to and above the overlaid tray deck portion. A vapor flow opening 109 is provided in the downstream portion of the enclosure member 108 located over the peripheral portion of the tray deck above the support ring and bounded at its lower edge by the main flat top surface of the tray deck, such that closed gas flow communication is provided from the vapor flow perforation openings in the adjacent perforated portion of the tray deck overlaid by the enclosure member to the vapor flow opening 109 in the enclosure member. In this manner, vapor flowing through the perforation openings and entering the enclosed spatial volume of the enclosure member 108 is directed through the vapor flow opening 109 into the liquid on the main flat top surface peripheral portion to effect vapor-liquid contact and prevent liquid flow stagnation in the region of the inner surface of the casing.

As shown, enclosure member 108 is rigidly secured to the clamp member 107 by means of bolt 104 joined at its lower end to the clamp member, washer 106 and nut 105. The enclosure member has a rectangular cross-section in a horizontal plane over its entire vertical extent. More specifically, the enclosure member has longitudinal side walls 111 and transverse end walls 112 disposed perpendicularly with respect to the side walls. The side walls and end walls have the same height measured upwardly from the tray deck main flat top surface to upper ends of the side walls and end walls. A horizontally aligned imperforate cover member 113 is gas-tightly joined at its peripheral edges to the upper ends of the side walls and end walls. The vapor flow opening 109 in the enclosure member 108 is located in the downstream longitudinal side wall 111.

Figure 5:
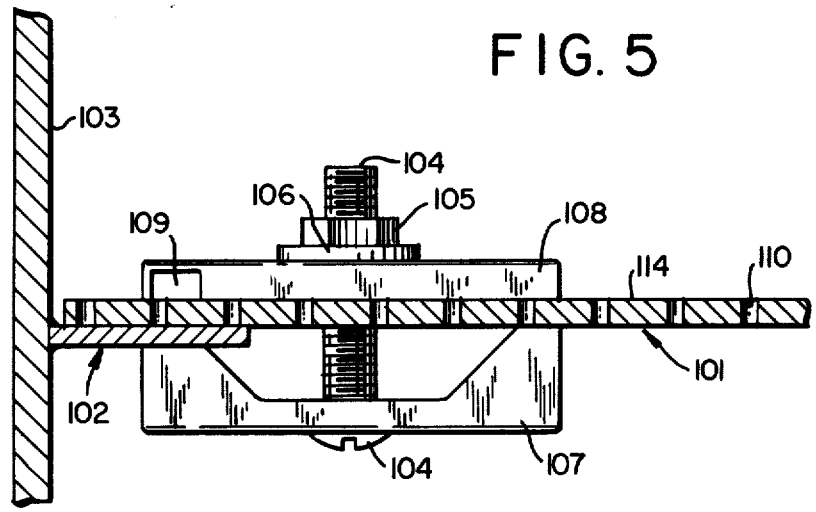
FIG. 5 is a sectional elevational view of the FIG. 4 vapor-liquid contacting system, taken along line A—A.

FIG. 5 is a sectional elevational view of the FIG. 4 vapor-liquid contacting system, taken along line A—A of FIG. 4. As shown, the enclosure 108 resides on the main flat top surface of the tray deck 114 and is rigidly secured to the clamp member 107 by means of bolt 104, washer 106 and nut 105. The enclosure overlies and extends transversely across the deck main flat top surface from a peripheral portion thereof above the support ring 102 to an adjacent perforation portion of the tray deck wherein the vapor flow perforation openings 110 are unobstructed by the support ring. In the manner, the enclosure member forms an enclosed spatial volume with respect to and above the overlaid tray deck portion. Vapor flowing through the unobstructed vapor flow perforation openings enters the enclosed spatial volume of the enclosure member 108 and is directed through the vapor flow opening 109 into the liquid on the main flat top surface peripheral portion. The kinetic energy of the vapor flowing through the opening 109 imparts thrust to the liquid proximate to the opening and causes the liquid to flow at sufficiently high rate to overcome the frictional drag force on the liquid exerted by the inner surface of the column casing 103 which is wetted by the liquid and the frictional drag force associated with the peripheral portion of the tray deck. Concurrently, the flow of vapor through the opening 109 of the enclosure member 108 effects vapor-liquid contact on the peripheral portion of the tray deck above the support ring 102, where the vapor flow perforation openings 110 in the tray deck 114 are blocked by the underlying support ring 102, so that the peripheral portion of the tray deck above the support ring would otherwise be unavailable for vapor-liquid contacting.

FIG. 6 is a sectional elevational view of the contacting tray assembly of FIG. 4, taken along line B—B. As shown, the lower ends of the vertical walls of the enclosure member 108 abut the main flat top surface of the tray deck 114 of form a substantially gas-tight seal therewith. In this manner, closed gas flow communication is provided from the vapor flow perforation openings in the adjacent perforated portion of the tray deck overlaid by the enclosure member to the vapor flow opening 109 in the enclosure member, whereby vapor flowing through the perforation openings 110 and entering the enclosed spatial volume of the enclosure member 108 is directed through the vapor flow opening 109 into the liquid on the main flat top surface peripheral portion of the tray deck to effect vapor-liquid contact and prevent liquid flow stagnation in the region of the inner surface of the casing.

FIG. 7–10 show various alternative forms of the enclosure member which may be suitably employed in the practice of the present invention. FIG. 7 shows an enclosure member 150 having a pyramidal configuration with a vapor flow opening 152 in one of its side walls and an opening 151 in the top of the enclosure member for bolting the enclosure member to the tray assmebly. FIG. 8 shows an enclosure member 153 having longitudinal side walls 154, transverse end walls 155 and an arcuate roof 156. Roof 156 has an opening 157 in its central part for bolting the enclosure member to the tray assembly and longitudinal side wall 154 is provided with vapor flow opening 158 for flow of vapor into the liquid on the main flat top surface peripheral portion of the tray deck. FIG. 9 shows an enclosure member 159 which is triangular in configuration, with equilateral side walls 160 and a cover member 161 having central opening 162 therein for bolting to the tray assembly. The vapor flow opening 163 of the enclosure member is provided in one of the side walls 160. FIG. 10 shows an enclosure member 164 which is hemispherical in configuration, with vapor flow opening 166 being provided at the lower periphery of the enclosure member and a top opening 165 for accommodating a bolt for rigidly securing the enclosure member to the tray assembly.

Figure 11:
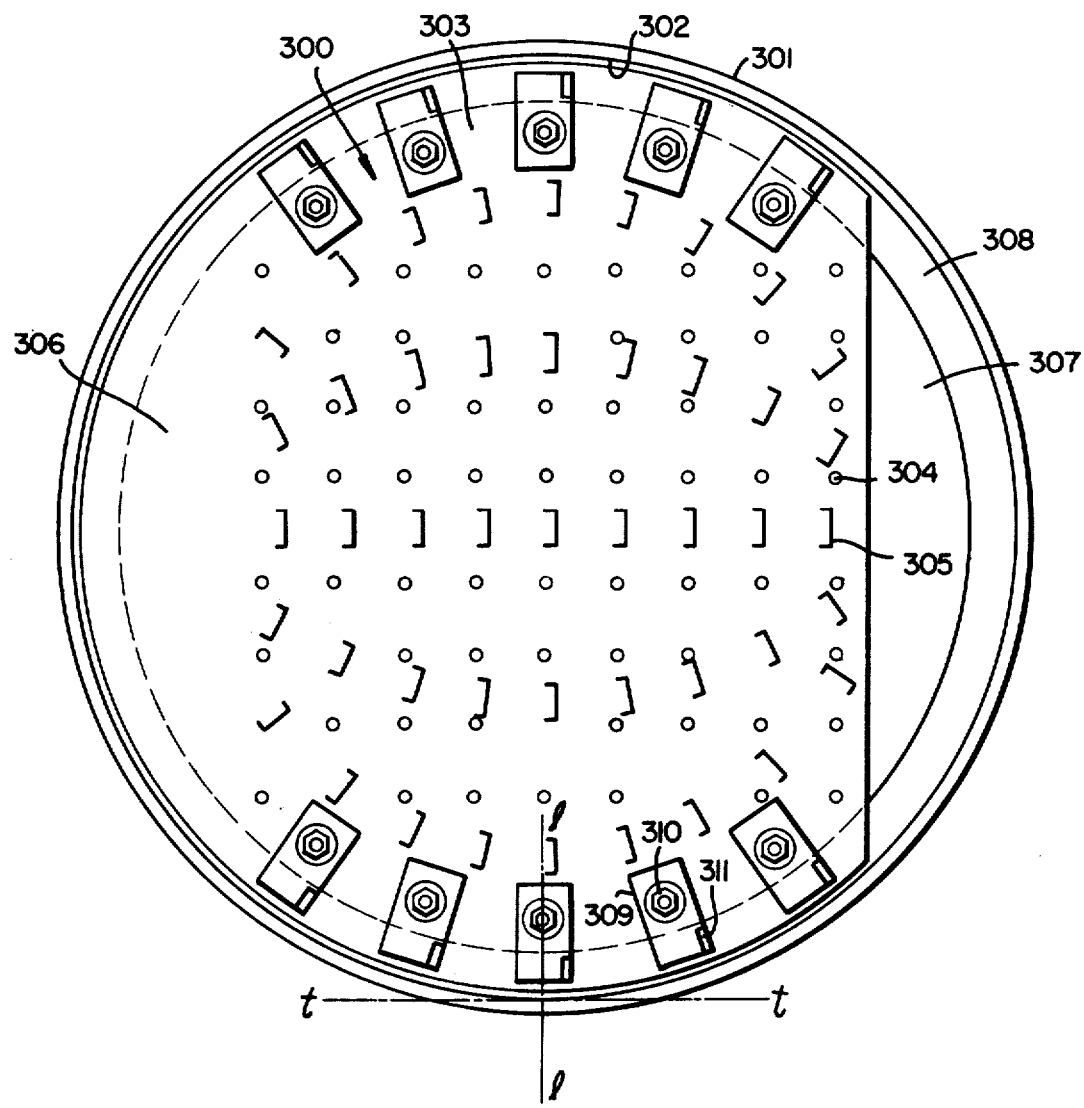
FIG. 11 is a plan view of a portion of a vapor-liquid contacting column, showing a contacting tray employing a plurality of enclosure members along the peripheral portions of the tray.

FIG. 11 is a plan view of a vapor-liquid contacting column in which is mounted a vapor-liquid contacting tray wherein a plurality of enclosure members is provided along peripheral portions of the contacting tray. The vapor-liquid contacting column includes a casing 301 in which a generally horizontally aligned vapor-liquid contacting tray 300 is disposed, mounted in the casing on an imperforate support ring 308 joined to the inner surface 302 of the casing 301 and extending horizontally inwardly therefrom such that the support ring underlies the peripheral portions of the contacting tray 300 for support thereof.

The contacting tray 300 includes a horizontally aligned deck 303 having main flat top and bottom surfaces, with vapor flow openings 304 extending through the deck. The tray deck also features a plurality of slots 305 distributed across its surface. The slots 305 may be formed in the manner disclosed in U.S. Pat. No. 3,417,975 to Williams et al, whereby the slots function to inject vapor horizontally into the liquid on the main flat top surface of the tray deck. Such horizontal injection of vapor into the liquid on the main flat top surface of the tray deck supplies kinetic energy to the liquid to compensate for the frictional energy loss in the liquid flow on the tray deck, thereby eliminating hydraulic gradients in the flowing liquid. Tray 300 features liquid inlet means comprising an imperforate liquid inlet tray portion 306 at one edge of the tray deck and liquid discharge downcomer means 307 at an opposite edge thereof whereby a liquid flow path is formed extending across the tray deck from the liquid inlet to the liquid discharge including peripheral flow path portions adjacent the inner surface of the casing 301. A plurality of enclosure members 309 are provided along the peripheral portions of the tray adjacent the inner surface 302 of the casing 301. Each of the enclosure members 309 is rigidly secured to the tray assembly by connector means 310 and each enclosure member features a vapor flow opening in a downstream portion of the enclosure member located over the peripheral portion of the tray deck above the support ring 308 and bounded at its lower edge by the main flat top surface of the tray deck. The enclosure members in FIG. 11 are each constructed in the same manner as shown and described in connection with FIG. 4 herein. Each of the enclosure members 309 has a longitudinal axis 1—1 which is substantially perpendicular to a tangent t—t to the casing inner surface 302 at the point of intersection of the longitudinal axis 1—1 with the casing inner surface. Such alignment of the enclosure members is preferred to facilitate the prevention of liquid flow stagnation in the liquid on the main flat top surface peripheral portions of the tray deck in the region of the inner surface of the casing 301. In the fabrication of trays of the general type as shown in FIG. 11, it is in general desirable to maintain the ratio of the area of vapor flow openings 311 of the enclosure members 309, in square feet, to the unit length of tray edge periphery, in feet, from about 0.005 to 0.15. At ratio values below about 0.005, not enough vapor flow opening area is provided to supply sufficient thrust to the liquid to overcome the frictional drag force on the liquid exerted by the inner casing wall and peripheral portion of the tray deck, with the result that liquid flow stagnation will occur on the peripheral portions of the tray adjacent the inner surface of the casing. On other hand, ratio values above about 0.15 are generally undesirable for the reason that an excessive amount of vapor flow opening areas has been provided, which in turn results in over-propulsion of the liquid in the region of the casing inner wall surface. Such over-propulsion of the liquid in the region of the casing wall surface is associated with an inadequate retention time for the liquid on the tray surface relative to the liquid traversing the central portions of the tray deck; mass transfer is thereby decreased on the peripheral portions of the tray deck, with consequent adverse effect on the overall transfer efficiency of the vapor-liquid contacting tray.

Figure 12:
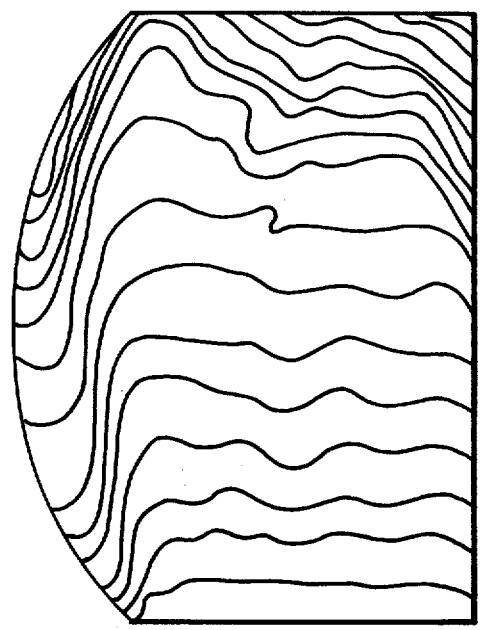
FIG. 12 is a flow distribution diagram for a conventional cross-flow contacting tray not employing the means of the present invention.
Figure 13:
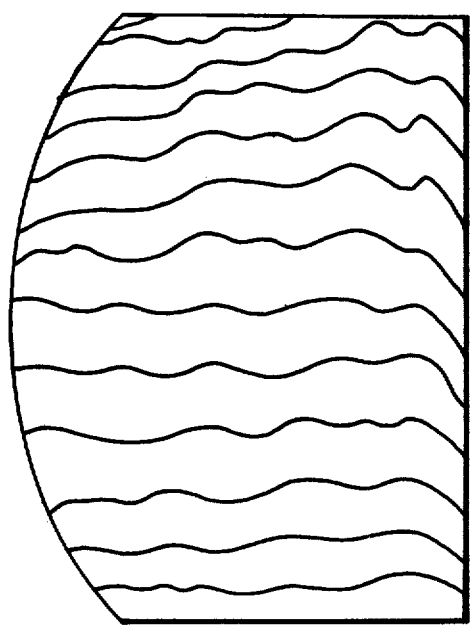
FIG. 13 is flow distribution diagram which is illustrative of the improvement which is achievable with the means of the present invention.
Figure 14:
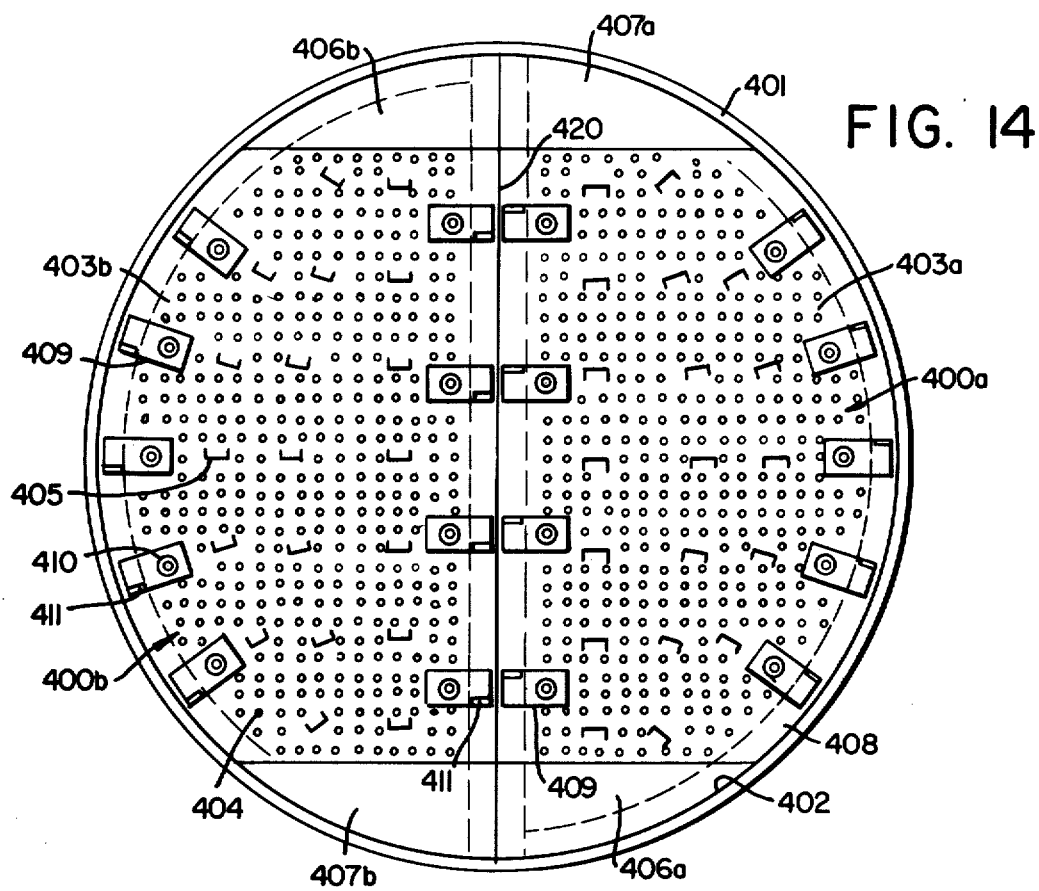
FIG. 14 is a plan view of a portion of a vapor-liquid contacting column, showing a contacting tray of the parallel flow type, employing the present invention.

In order to show the advantages obtainable with the means of the present invention, hydraulic flow profile tests were carried out using a vapor-liquid contacting sieve tray of the parallel flow type having a diameter of 25 feet. The tests were carried out as follows. A device for pouring a distinct line of ink across the width of the tray deck into the liquid was mounted at the liquid inlet end of the tray deck. As the liquid flowed along the liquid flow path on the main flat top surface of the tray deck from the liquid inlet to the liquid discharge, the line of ink was carried by the liquid across the tray at the same velocity as the liquid. Film of the ink line's progress across the tray deck was taken, and from the film the hydraulic flow profiles in FIG. 12 and FIG. 13 were generated. These Figures represent the ink lines at discrete intervals of time as they passed over the tray deck. FIG. 12 shows the hydraulic flow profiles for a vapor-liquid contacting tray not employing the peripheral tray portion vapor thrust means of the present invention, wherein the tray deck perforation openings in the peripheral portions of the tray were blocked by the underlying imperforate support ring. FIG. 13 shows the hydraulic flow profiles for a vapor-liquid contacting tray which was physically suspended above the support ring in the contacting column casing so that the peripheral portions of the tray deck were not blocked by the support ring and which employed slot means of the type shown in FIG. 2 herein along the peripheral portions of the tray deck to simulate the performance behavior which would be expected using the peripheral tray portions vapor thrust means of the present invention. The hydraulic flow profiles of FIG. 12 show a retardation of the liquid flow velocity in the peripheral portions of the tray deck adjacent to the casing inner wall, which is attributable to the frictional drag on the liquid exerted by the wetted wall surface. By contrast, the FIG. 13 hydraulic flow profiles show virtually negligible retardation of the liquid flow on the tray deck peripheral portion adjacent to the casing inner wall surface. The improvement shown by the hydraulic flow profiles of FIG. 13 relative to those shown in FIG. 12 is commensurate with the improvement which is achievable using the peripheral tray portion vapor thrust means of the present invention.

FIG. 12 is a plan view of a vapor-liquid contacting column in which is mounted a parallel flow vapor-liquid contacting tray wherein a plurality of enclosure members are provided along peripheral portions and the centerline of the contacting tray. The vapor-liquid contacting column includes a casing 401 in which a generally horizontally aligned vapor-liquid contacting tray comprising tray half-sections 400a and 400b is disposed, mounted in the casing on an imperforate support ring 408 joined to the inner surface 402 of the casing 401 and extending horizontally inwardly therefrom such that the support ring underlies the peripheral portions of the contacting tray half-sections 400a and 400b for and 400b for support thereof. The support ring also extends across the contacting column to support inner portions of the tray half-sections 400a and 400b.

The contacting tray half-sections 400a and 400b include horizontally aligned decks 403a and 403b having main flat top and bottom surfaces, with vapor flow openings 404 extending through the decks. The tray decks also feature a plurality of slots 405 distributed across their surfaces. The slots 405 may be formed in the manner disclosed in U.S. Pat. No. 3,417,975 to Williams et al, whereby the slots function to inject vapor horizontally into the liquid on the main flat top surface of the tray deck. Such horizontal injection of vapor into the liquid on the main flat top surface of the tray deck supplies kinetic energy to the liquid to compensate for the frictional energy loss in the liquid flow on the tray deck, thereby eliminating hydraulic gradients in the flowing liquid. Tray half-sections 400a and 400b feature liquid inlet means comprising imperforate liquid inlet tray portions 406a and 406b at one edge of the tray decks and liquid discharge downcomer means 407a and 407b at an opposite edge thereof whereby a liquid flow path is formed extending across the tray deck portions from the liquid inlet to the liquid discharge thereof including peripheral flow path portions adjacent the inner surface of the casing 401. A plurality of enclosure members 409 are provided along the peripheral portions of the tray adjacent the inner surface 402 of the casing 401 and along the center tray baffle 420 on the inner portions of the tray half-sections 400a and 400b. Each of the enclosure members 409 is rigidly secured to the tray assembly by connector means 410 and each enclosure member features a vapor flow opening 411 in a downstream portion of the enclosure member located over the portion of the tray deck above the support ring 408 and bounded at its lower edge by the main flat top surface of the tray deck. The enclosure members in FIG. 12 are each constructed in the same manner as shown and described in connection with FIG. 4 herein. In the fabrication of trays of the general type as shown in FIG. 12, it is in general desirable to maintain the ratio of the area of vapor flow openings 411 of the enclosure members 409, in square feet, to the unit length of tray edge periphery, in feet, from about 0.005 to 0.15. At ratio values below about 0.005, not enough vapor flow opening area is provided to supply sufficient thrust to the liquid to overcome the frictional drag force on the liquid exerted by the inner casing wall, the peripheral portions of the tray deck and the center tray baffle, with the result that liquid flow stagnation will occur on the peripheral portions of the tray adjacent the inner surface of the casing. On the other hand, ratio values above about 0.15 are generally undesirable for the reason that an excessive amount of vapor flow opening area has been provided, which in turn results in over-propulsion of the liquid in the region of the casing inner wall surface or center baffle. Such over-propulsion of the liquid in the region of the casing wall surface or center baffle is associated with an inadequate retention time for the liquid on the tray surface relative to the liquid traversing the central portions of the tray deck; mass transfer is thereby decreased on the peripheral portions of the tray deck, with consequent adverse effect on the overall transfer efficiency of the vapor-liquid contacting tray.

Figure 15:
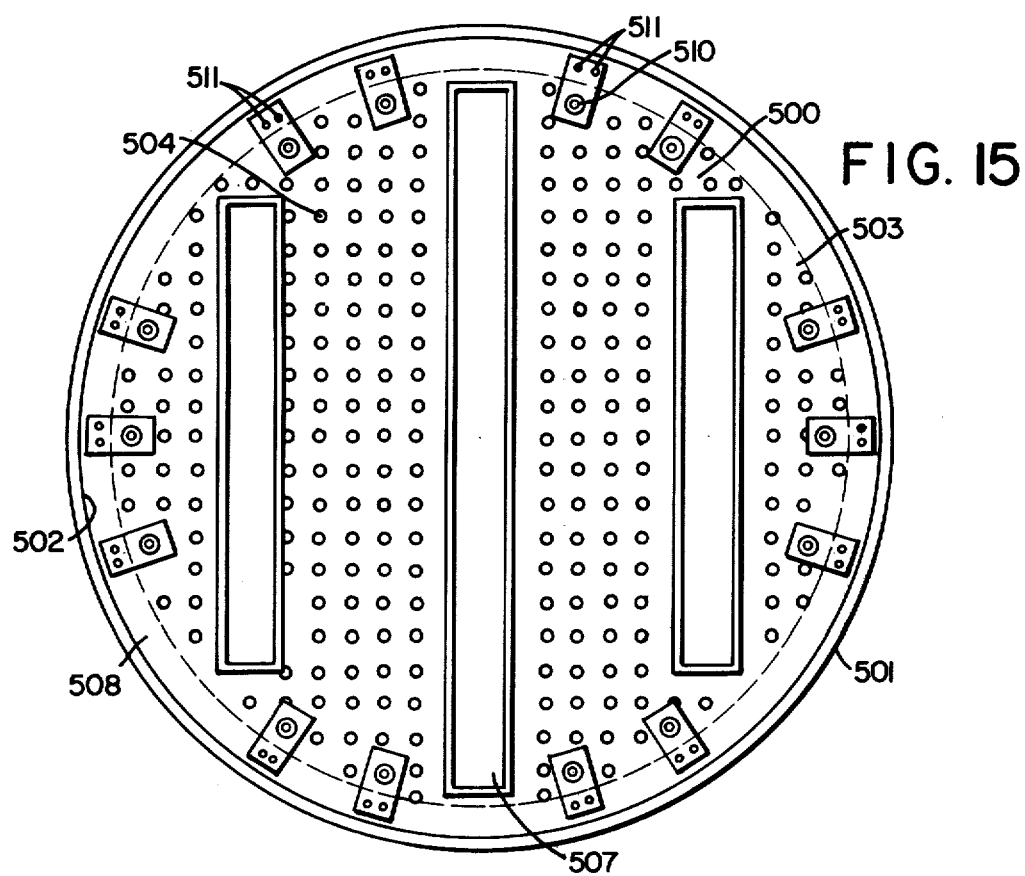
FIG. 15 is a plan view of a portion of a vapor-liquid contacting column, showing a contacting tray of the multiple downcomer type, employing the present invention.

FIG. 15 is a plan view of a vapor-liquid contacting column in which is mounted a vapor-liquid contacting tray of a type as disclosed and claimed in U.S. Pat. No. 3,410,540 to W. Bruckert, wherein a plurality of enclosure members is provided along peripheral portions of the contacting tray. The vapor-liquid contacting column includes a casing 501 in which a generally horizontally aligned vapor-liquid contacting tray 500 is disposed, mounted in the casing on an imperforate support ring 508 joined to the inner surface 502 of the casing 501 and extending horizontally inwardly therefrom such that the support ring underlies the peripheral portions of the contacting tray 500 for support thereof.

The contacting tray 500 includes a horizontally aligned deck 503 having main flat top and bottom surfaces, with vapor flow openings 504 extending through the deck. The tray deck also features a plurality of narrow, trough-like downcomer means 507 which are evenly spaced across the tray surface, such that the tray deck is divided into sections of substantially equal surface area per unit length of adjacent downcomer means. A plurality of enclosure members 509 are provided along the peripheral portions of the tray adjacent the inner surface 502 of the casing 501. Each of the enclosure members 509 is rigidly secured to the tray assembly by connector means 510 and each enclosure member features vapor flow openings 511 in the roof portion of the enclosure member located over the peripheral portion of the tray deck above the support ring 508. The enclosure members in FIG. 15 are each constructed in the same manner as shown and described in connection with FIG. 4 herein, except that the vapor flow openings are provided as perforations in the roof of the enclosure member.

Although preferred embodiments have been described in detail, it will be further appreciated that other embodiments are contemplated only with modification of the disclosed features, as being within the scope of the invention.

What is claimed is:

1. In a vapor-liquid contacting column including a casing in which a plurality of generally horizontally aligned vapor-liquid contacting trays are disposed, vertically spaced apart from one another and mounted in said casing on substantially imperforate support rings such that the support rings underlie portions of said contacting trays for support thereof, with clamp means for rigidly securing said contacting trays to said support rings, said contacting trays each including a horizontally aligned deck having main flat top and bottom surfaces, with vapor flow perforation openings extending through said deck, and liquid transfer means associated with the tray for transferring liquid previously contacted on said tray deck to a next underlying tray in said contacting column, the improvement comprising: an enclosure member overlying and extending transversely across said deck main flat top surface from a portion thereof above said support ring to an adjacent perforated portion of said tray deck wherein the vapor flow perforation openings are unobstructed by said support ring such that said enclosure member forms an enclosed spatial volume with respect to and above the overlaid tray deck portion, with a vapor flow opening in said enclosure member located over the portion of said tray deck above said support ring, such that closed gas flow communication is provided from the vapor flow perforation openings in said adjacent perforated portion of said tray deck overlaid by said enclosure member to said vapor flow opening in said enclosure member, whereby vapor flowing through said perforation openings and entering said enclosed spatial volume of said enclosure member is directed through said vapor flow opening into the liquid on the tray deck main flat top surface portion overlying said support ring, to effect vapor-liquid contact and prevent liquid flow stagnation thereon.

2. Apparatus according to claim 1 wherein said enclosure member is rigidly secured to said clamp means.

3. Apparatus according to claim 1 wherein said vapor flow opening in said enclosure member is oriented so as to direct liquid by vapor propulsion toward said liquid transfer means.

4. In a vapor-liquid contacting column including a casing in which a plurality of generally horizontally aligned vapor-liquid contacting trays are disposed, vertically spaced apart from one another and mounted in said casing on imperforate support rings joined to an inner surface of said casing and extending horizontally inwardly therefrom such that the support rings underlie the peripheral portions of said contacting trays for support thereof, with clamp means for rigidly securing said contacting trays to said support rings, said contacting trays each including a horizontally aligned deck having main flat top and bottom surfaces, with vapor flow perforation openings extending through said deck, and liquid inlet means at one edge of said tray deck and liquid discharge means at an opposite edge thereof whereby a liquid flow path is formed extending across said tray deck main flat top surface from said liquid inlet to said liquid discharge including peripheral flow path portions adjacent said inner surface of said casing, the improvement comprising: an enclosure member overlying and extending transversely across said deck main flat top surface from a peripheral portion thereof above said support ring to an adjacent perforated portion of said tray deck wherein the vapor flow perforation openings are unobstructed by said support ring such that said enclosure member forms an enclosed spatial volume with respect to and above the overlaid tray deck portion, with a vapor flow opening in a downstream portion of said enclosure member located over the peripheral portion of said tray deck above said support ring and bounded at its lower edge by the main flat top surface of said tray deck, such that closed gas flow communication is provided from the vapor flow perforation openings in said adjacent perforated portion of said tray deck overlaid by said enclosure member to said vapor flow opening in said enclosure member, whereby vapor flowing through said perforation openings and entering said enclosed spatial volume of said enclosure member is directed through said vapor flow opening into the liquid on the tray deck main flat top surface peripheral portion overlying said support ring, to effect vapor-liquid contact and prevent liquid flow stagnation in the region of said inner surface of said casing.

5. Apparatus according to claim 4 wherein said enclosure member has a rectangular cross-section in a horizontal plane over its entire vertical extent.

6. Apparatus according to claim 5 wherein said enclosure member has longitudinal side walls and transverse end walls disposed perpendicularly with respect to said side walls, said side walls and end walls having the same height measured upwardly from said tray deck main flat top surface to upper ends of said side walls and end walls, with a horizontally aligned cover member gastightly joined at its peripheral edges to the upper ends of said side walls and end walls.

7. Apparatus according to claim 6 wherein said enclosure member has a longitudinal axis which is substantially perpendicular to a tangent to the casing inner surface at the point of intersection of said longitudinal axis with the casing inner surface.

8. Apparatus according to claim 6 wherein said vapor flow opening in said enclosure member is located in a downstream longitudinal side wall.

9. Apparatus according to claim 4 wherein a plurality of said enclosure members are provided along peripheral portions of said tray.

10. Apparatus according to claim 9 wherein the ratio of area of vapor flow openings of said enclosure members, in feet$^2$, per unit length of tray edge periphery, in feet, is from 0.005 to 0.015.

* * * * *